US009160179B2

(12) United States Patent
Someya (10) Patent No.: US 9,160,179 B2
(45) Date of Patent: Oct. 13, 2015

(54) CHARGING APPARATUS AND CHARGING METHOD

(71) Applicant: CASIO COMPUTER CO., LTD., Tokyo (JP)

(72) Inventor: Kaoru Someya, Kiyose (JP)

(73) Assignee: CASIO COMPUTER CO., LTD., Tokyo (JP)

(*) Notice: Subject to any disclaimer, the term of this patent is extended or adjusted under 35 U.S.C. 154(b) by 200 days.

(21) Appl. No.: 13/959,460

(22) Filed: Aug. 5, 2013

(65) Prior Publication Data

US 2014/0062420 A1 Mar. 6, 2014

(30) Foreign Application Priority Data

Sep. 3, 2012 (JP) ................................. 2012-193198

(51) Int. Cl.
*H02J 7/00* (2006.01)
(52) U.S. Cl.
CPC ................ *H02J 7/00* (2013.01); *H02J 7/0018* (2013.01); *H02J 7/0019* (2013.01)
(58) Field of Classification Search
CPC ........................................................ H02J 7/00
USPC ....................................................... 320/166
See application file for complete search history.

(56) References Cited

U.S. PATENT DOCUMENTS

| 5,369,351 | A | * | 11/1994 | Adams | 320/121 |
| 5,528,121 | A | * | 6/1996 | Okamura | 320/167 |
| 5,844,792 | A | * | 12/1998 | Moreau | 363/89 |
| 5,982,145 | A | * | 11/1999 | Eguchi | 320/128 |
| 6,323,623 | B1 | | 11/2001 | Someya et al. | |
| 8,149,559 | B2 | * | 4/2012 | Kakehi et al. | 361/207 |
| 8,427,099 | B2 | * | 4/2013 | Wong | 320/107 |

FOREIGN PATENT DOCUMENTS

| JP | 2001-061235 A | 3/2001 |
| JP | 3738617 B2 | 1/2006 |

* cited by examiner

*Primary Examiner* — Sun Lin
(74) *Attorney, Agent, or Firm* — Holtz, Holtz, Goodman & Chick PC (57) ABSTRACT

Capacitor elements are connected in series and charged until a voltage between terminals of a capacitor element whose capacitance is lowest among the capacitor elements reaches a withstanding voltage. When the voltage between the terminals of the capacitor element reaches the withstanding voltage, the capacitor elements are connected in parallel, and electric charge of the capacitor element is transferred to the other capacitor elements. Hereafter, an operation of switching between series connection and parallel connection is repeated such that the capacitor elements are connected in series and charged again when the voltage between the terminals of the capacitor element is reduced to a full charge voltage due to an outflow of the electric charge, and the capacitor elements are connected in parallel when the voltage between the terminals of the capacitor element reaches the withstanding voltage.

5 Claims, 10 Drawing Sheets

FIG. 10

# CHARGING APPARATUS AND CHARGING METHOD

CROSS-REFERENCE TO RELATED APPLICATION

This application is based upon and claims the benefit of priority from the prior Japanese Patent Application No. 2012-193198, filed Sep. 3, 2012, the entire contents of which are incorporated herein by reference.

BACKGROUND OF THE INVENTION

1. Field of the Invention

The present invention relates to a charging apparatus which can rapidly charge and a charging method.

2. Description of the Related Art

In recent years, various charging apparatuses including electric double-layer capacitors have been developed. For example, in Japanese Patent No. 3738617, there has been disclosed a charging apparatus in which the control of switching between series connection and parallel connection of a plurality of electric double-layer capacitors is performed at every constant cycle. In this charging apparatus, when connected in series, the plurality of electric double-layer capacitors are charged. In contrast, when the plurality of electric double-layer capacitors are connected in parallel, a charge voltage is monitored and, when the charge voltage exceeds a reference voltage, the charge of electricity to the plurality of electric double-layer capacitors is stopped.

In the technology disclosed in Japanese Patent No. 3738617, since the control of switching between series connection and parallel connection of a plurality of electric double-layer capacitors is performed at every constant cycle and the plurality of electric double-layer capacitors are charged when they are connected in series, there is a problem in that a consecutive charging operation cannot be performed and therefore rapid charge cannot be performed.

SUMMARY OF THE INVENTION

In view of the aforementioned problems, an object of the present invention is to provide a charging apparatus which, can rapidly charge and a charging method.

In order to achieve the above-described object, in accordance with one aspect of the present invention, there is provided a charging apparatus comprising: a monitor section which monitors a voltage between terminals of a first capacitor element among a plurality of capacitor elements; a series charging section which connects the plurality of capacitor elements in series and charges the capacitor elements until the voltage between the terminals of the first capacitor element, which is monitored by the monitor section, reaches a first voltage; a parallel discharging section which connects the plurality of capacitor elements in parallel and brings the voltage between the terminals of the first capacitor element close to a voltage between terminals of other capacitor elements, when the voltage between the terminals of the first capacitor element which is monitored by the monitor section, reaches the first voltage; and a series-parallel switching section which repeats an operation of switching between parallel connection and series connection such that the series charging section connects the plurality of capacitor elements in series and charges the capacitor elements when the voltage between the terminals of the first capacitor element, which is monitored by the monitor section, is reduced to a second voltage, and the parallel discharging section connects the plurality of capacitor elements in parallel and brings the voltage between the terminals of the first capacitor element close to the voltage between the terminals of the other capacitor elements when the voltage between the terminals of the first capacitor element reaches the first voltage.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
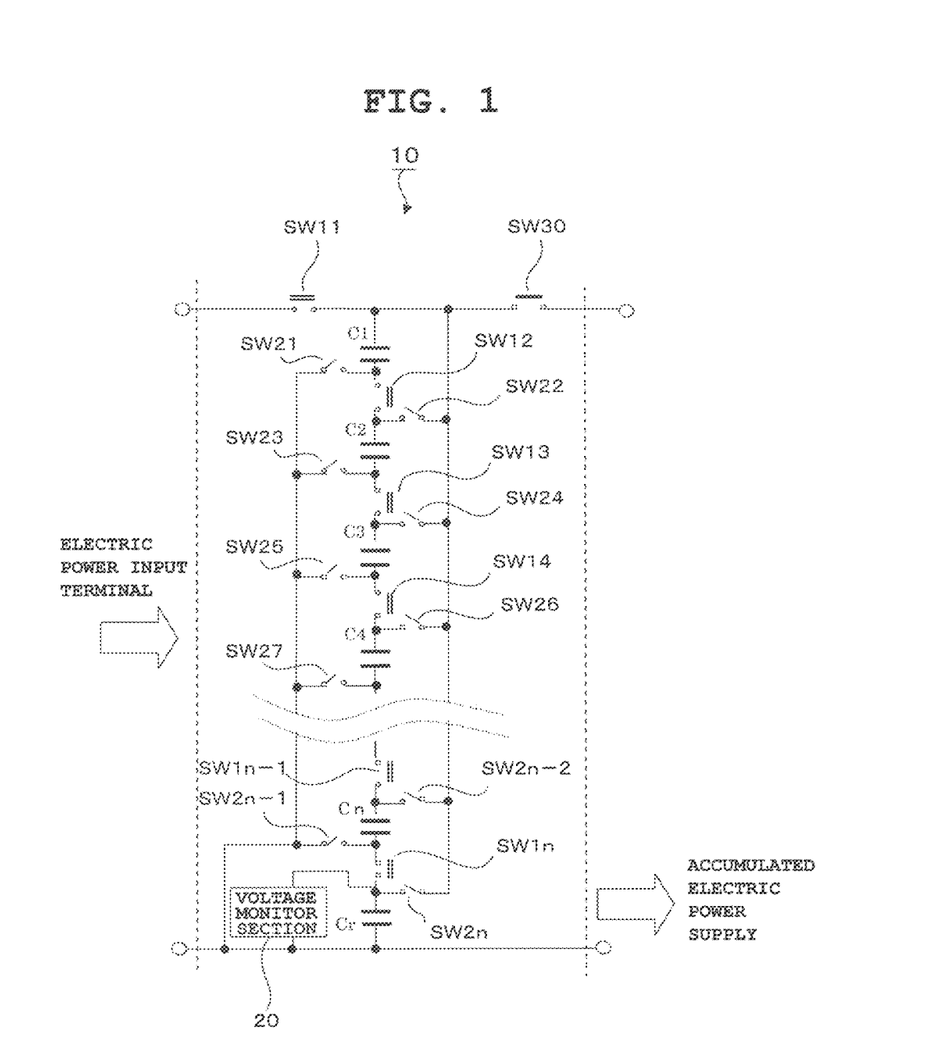
FIG. 1 is a schematic circuit diagram illustrating the structure of a charging apparatus 10 of a first embodiment of the present invention.

Hereinafter, the embodiment of the present invention will be described below referring to the drawings. FIG. 1 is a schematic circuit diagram illustrating the structure of a charging apparatus 10 of the first embodiment of the present invention. The charging apparatus 10 is constituted by switching elements SW11 to SW1n, switching elements SW21 to SW2n, a switching element 30, capacitor elements C1 to Cn, and Cr, and a voltage monitor section 20, which are provided between a power source side (electric power input terminal side) not illustrated and a load side (accumulated electric power supply side).

The switching elements SW11 to SW1n are set to be turned off when not charged, and set to be turned on when charged, so that the capacitor elements C1 to Cn, and Cr are connected to a power source in series. The switching elements SW21 to SW2n are set to be turned on when charged, and set to be turned off when not charged, so that the capacitor elements C1 to Cn, and Cr are connected to the power source in parallel. The switching element 30 is set to be turned on when the electric power is supplied to the load side (accumulated electric power supply side).

Figure 2:
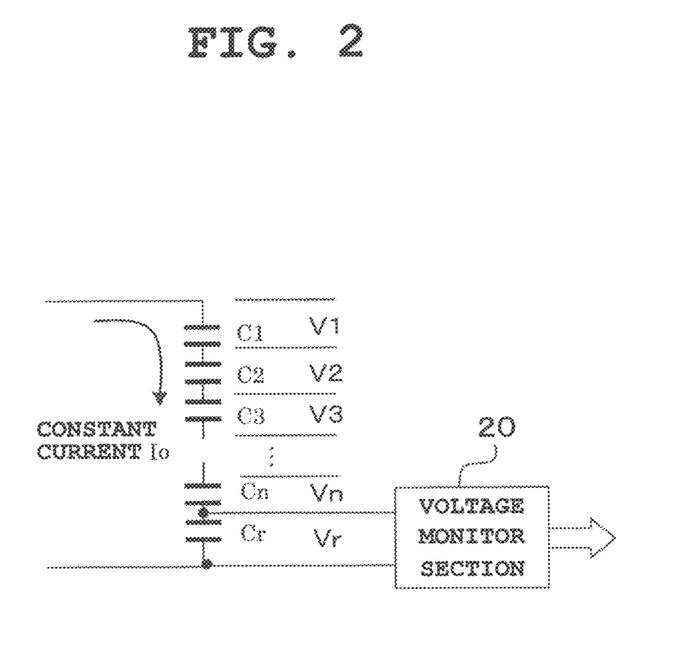
FIG. 2 is a diagram illustrating a series circuit which is formed at a time of charging.

As illustrated in FIG. 2, in a state where the capacitor elements C1 to Cn, and Cr have been connected in series by the switching elements SW11 to SW1n which are set to be turned on at the time of being charged, a constant current $I_0$ is supplied to the capacitor elements C1 to Cn, and Cr in which electric double-layer capacitors are used. The voltage monitor section 20 performs on-off control of the switching elements SW11 to SW1n and the switching elements SW21 to SW2n based on a voltage Vr between terminals of the capacitor Cr which is monitored at all times, and repeats the later-described operation of switching between series connection and parallel connection, thereby making it possible to rapidly charge.

As illustrated in FIG. 2, the capacitor elements C1 to Cn, and Cr are connected in series by the switching elements SW11 to SW1n which are set to be turned on at the time of being charged, whereby a series charging circuit is formed, and the constant current $I_0$ is supplied to the series charging circuit from the power source side. When the capacitance of the capacitor elements C1 to Cn, and Cr is equal, the voltage between the terminals of each capacitor element becomes equal. In contrast, when the capacitance of the capacitor elements C1 to Cn, and Cr is different, the voltage between the terminals, which is in proportional to the reciprocal of the capacitance, is generated, as represented in a formula (1) as follows.

$$Q = C1\,V1 = C2\,V2 = \ldots Cn\,Vn = Cr\,Vr \qquad (1)$$

When the voltage between the terminals exceeds a predetermined voltage value (withstanding voltage), the electrolyte of the electric double-layer capacitors is deteriorated, which substantially reduces the expected life span of the electric double-layer capacitors. Accordingly, it is necessary to keep the voltage between the terminals in such a manner that the voltage between the terminals becomes equal to or lower than the withstanding voltage. As a matter of course, since the voltage V between the terminals equals an electric charge Q divided by the capacitance C (V=Q/C), the reduction of the capacitance C means an increase in the voltage. V between the terminals. Accordingly, in the aforementioned formula (1), the voltage V between the terminals is the highest when the capacitance C of the capacitor is the lowest, and the voltage between the terminals of other capacitors does not exceed the highest voltage value. That is, only the voltage V between the terminals of the capacitor whose capacitance C is the lowest is monitored, and it is not necessary to monitor the voltages V between the terminals of other capacitors.

Figure 3:
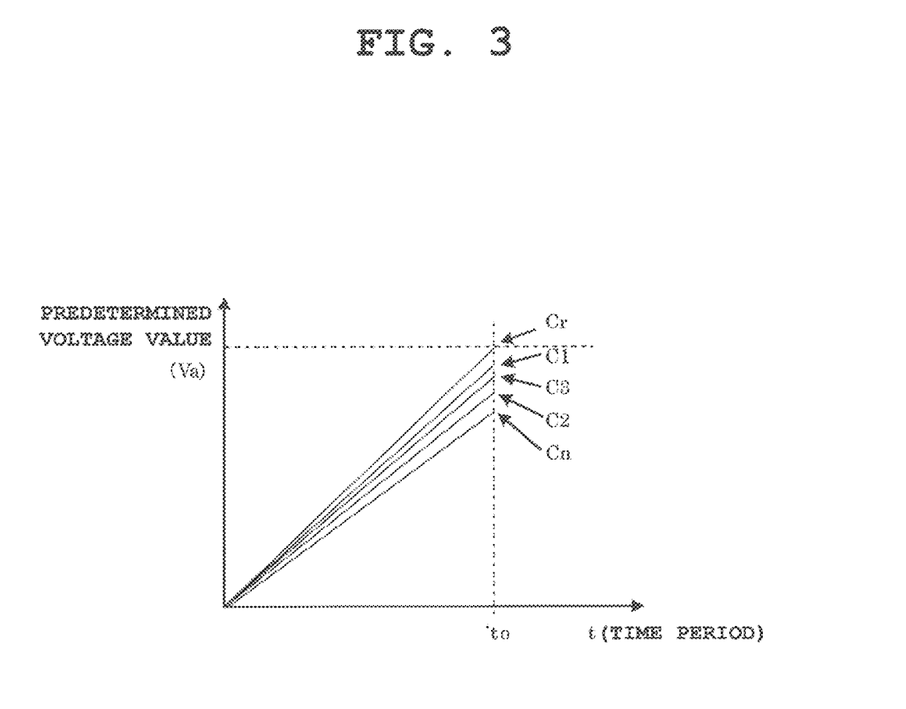
FIG. 3 is a graph illustrating a rising characteristic of a voltage between the terminals of each capacitor element at an initial state when charged.

In a transient state where the constant current $I_0$ is supplied to the series charging circuit illustrated in FIG. 2 so as to start charging the capacitors, the voltage between the terminals of the capacitor element Cr, whose capacitance is the lowest, rises to the highest degree with regards to the gradient of the voltage-capacitance graph, as illustrated in FIG. 3. That is, in the case of Cr<C1<C3<C2<Cn, in the voltage V between the terminals of the capacitor element Cr whose capacitance is the lowest among the capacitor elements, the period of time required to reach a predetermined voltage value Va is the shortest.

Figure 4:
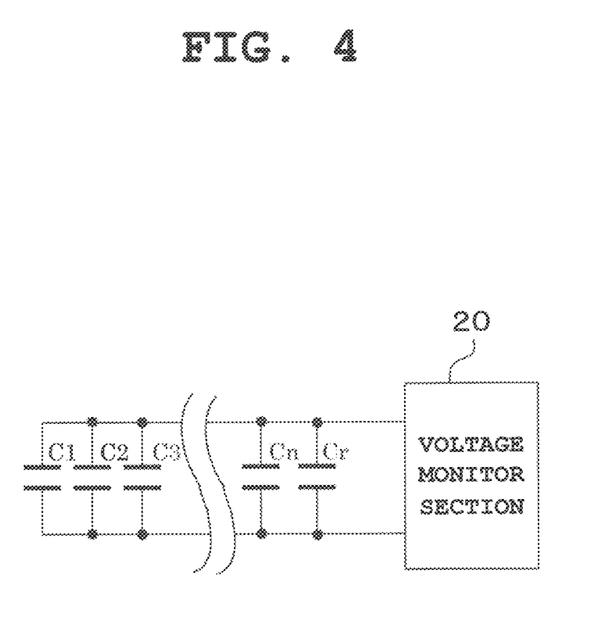
FIG. 4 is a diagram illustrating a parallel circuit which is formed at a time of completion of charging.
Figure 5:
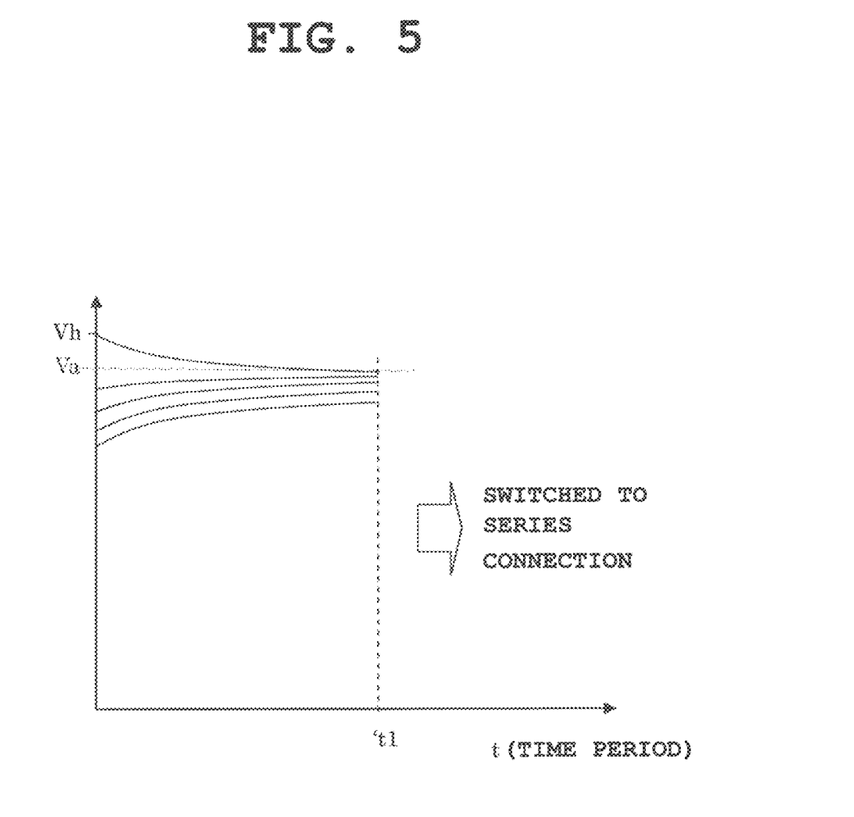
FIG. 5 is a graph illustrating the characteristics of charging and discharging at a time of switching from the series circuit to the parallel circuit.

At a time point when the voltage between the terminals reaches the predetermined voltage value Va, the switching elements SW11 to SW1n are set to be turned off, and the switching elements SW21 to SW2n are set to be turned on, whereby all the capacitor elements C1 to Cn, and Cr are connected in parallel, and the equalization of the voltage between the terminals of each of the capacitor elements C1 to Cn, and Cr is performed, as illustrated in FIG. 4. At this point, as illustrated in FIG. 3, the voltage between the terminals of the capacitor element Cr is the highest potential. Accordingly, the electric charge of the capacitor element Cr is transferred to the other capacitor elements C1 to Cn, as illustrated in FIG. 5.

That is, when the voltage between the terminals of the capacitor element Cr is the highest potential Vh, the voltage between the terminals of the capacitor element Cr is changed to the predetermined voltage value Va due to the outflow of the electric charge in accordance with discharge characteristics. In contrast, in the case of the other capacitor elements C1 to Cn whose capacitance is higher than the capacitance of the capacitor element Cr, the voltage between the terminals is changed to the predetermined voltage value Va due to the inflow of the electric charge in accordance with charge characteristics.

Figure 6:
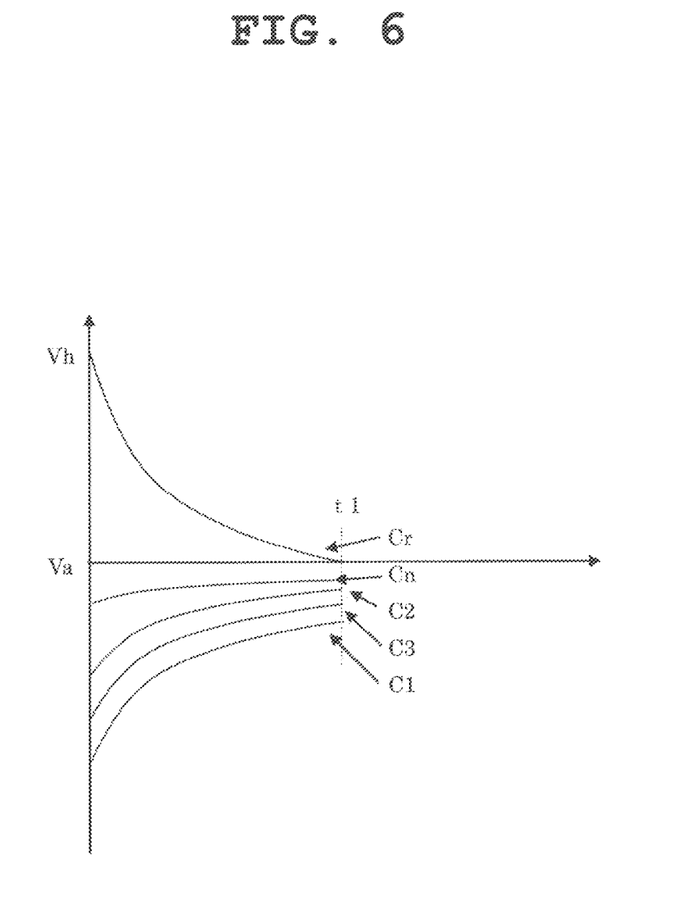
FIG. 6 is an enlarged view of the characteristics of charging and discharging illustrated in FIG. 5.
Figure 7A:
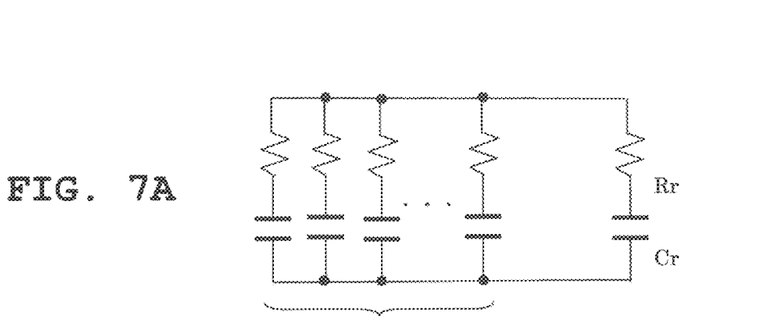
FIGS. 7A and 7B are diagrams illustrating the equivalent circuit of the parallel circuit.

For example, regarding the transient response in the case where the capacitance is represented based on the relation of C1>C3>C2>Cn> . . . >Cr, the voltage Vh between the terminals of the capacitor element Cr whose capacitance is the lowest is converged into the predetermined voltage value Va at a time t1 in accordance with discharge characteristics, and each voltage between the terminals of the other capacitor elements C1 to Cn is changed in accordance with charge characteristics corresponding to each capacitance, as illustrated in the enlarged diagram of FIG. 6. When the predetermined voltage value Va is regarded as a full charge voltage, as is obvious in the parallel circuit illustrated in FIG. 7A, a current flowing through the other capacitor elements C1 to Cn except the capacitor element Cr depends on the internal resistance and the voltage between the terminals of each capacitor element.

In an equivalent circuit illustrated in FIG. 7B in which the composite capacitance and the composite internal resistance of the other capacitor elements C1 to Cn except the capacitor element Cr are respectively represented as Ca and Ra, the voltage between the terminals of each capacitor element becomes equal due to the transfer of the electric charge, and a formula (2), in which the transfer electric charge is represented as $\Delta Q$, is established as follows.

$$Va + \Delta Q/Ca = Vr - \Delta Q/Cr \qquad (2)$$

The transfer electric charge $\Delta Q$ cannot completely be transferred in a short period of time, which is attributed to a constant time of the capacitor. The constant time of the electric double-layer capacitor is approximately 0.5 seconds. Accordingly, when there is not a substantial difference in the capacitance of the capacitor elements to be used, the discharge constant time t of the transfer electric charge $\Delta Q$ in the parallel circuit is represented by a formula (3) as follows.

$$\text{discharge constant time } t = t_0(1 + 1/m - 1) \qquad (3)$$

Note that $t_0$ represents the discharge constant time of the capacitor element Cr whose capacitance is the lowest, and m represents the number of capacitor elements constituting the parallel circuit. Accordingly, as is obvious in the aforementioned formula (3), when m which represents the number of capacitor elements constituting the parallel circuit is large to some degree, the discharge constant time t of the parallel circuit made up of capacitors can be estimated as the discharge constant time $t_0$ of the capacitor element Cr whose capacitance is the lowest.

Incidentally, when it is assumed that the capacitance of the capacitor element Cr, whose capacitance is the lowest, is represented as 0.8 C with respect to the average capacitance C of the capacitor elements C1 to Cn, the voltage between the terminals of each of the capacitor elements C1 to Cn is represented as 0.8 Vh. Here, for example, when it is assumed that Vh equals 3.8 V (Vh=3.8 V), the average voltage between the terminals of each of the capacitor elements C1 to Cn is represented as 3.04 V. When it is assumed that the full charge voltage Va equals 3.7 V (Va=3.7 V), a time period during which the voltage between the terminals of the capacitor element Cr reaches the full charge voltage Va is substantially shorter than the constant time, according to the equalization of capacitors connected in parallel.

That is, a formula (4) is represented as follows, $$[-(Ca+Cr)/(Ra+Rr)\cdot Ca\cdot Cr]<1/t \quad (4)$$

In the above-mentioned formula (4), Ca represents the composite capacitance of the capacitor elements C1 to Cn, Ra represents the composite internal resistance of the capacitor elements C1 to Cn, Cr represents the capacitance of the capacitor element Cr, Rr represents the internal resistance of the capacitor element Cr, and t represents the discharge constant time.

Figure 7B:
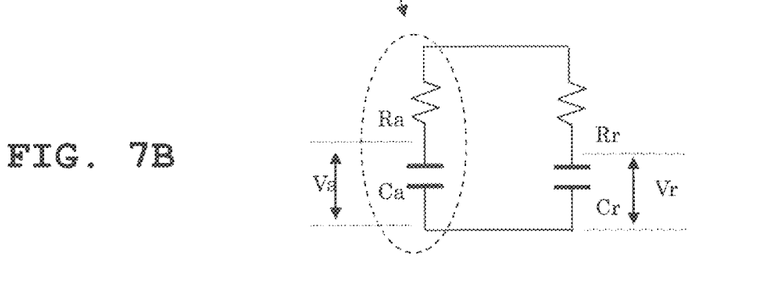

Then, when a current i flowing through the equivalent circuit of FIG. 7B is represented by an approximate expression based on the condition of the formula (4), a formula (5) is represented as follows $$i=[(Vh-Va)/(Ra+Rr)]\times\{1+[-(Ca+Cr)t]/(Ra+Rr)\cdot Ca\cdot Cr\} \quad (5)$$

Figure 8:
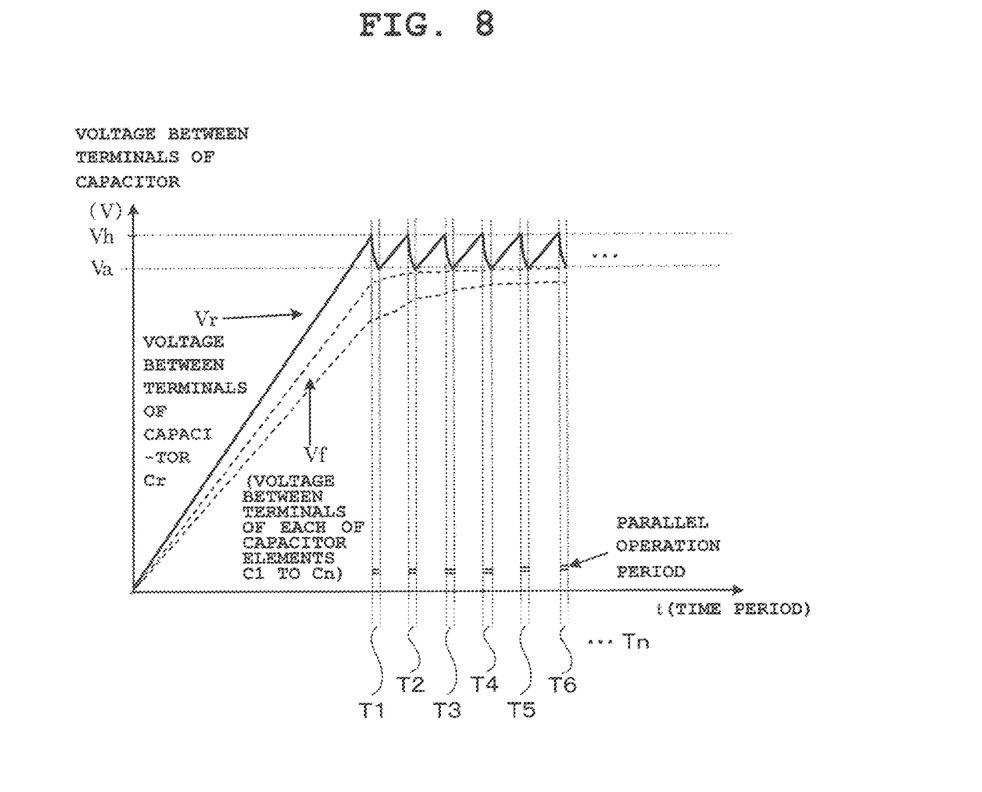
FIG. 8 is a graph illustrating the voltage between the terminals of the capacitor element, which is changed corresponding to the operation of switching between series connection and parallel connection when the capacitor elements are charged.

Next, the charging operation will be described referring to FIG. 8. FIG. 8 is a graph illustrating the voltage between the terminals of the capacitor element, which is changed corresponding to the operation of switching between series connection and parallel connection when the capacitor elements are charged. In the diagram, Vh represents the withstanding voltage, Va represents the full charge voltage, Vr represents the voltage between the terminals of the capacitor element Cr whose capacitance is the lowest, and Vf represents the voltage between the terminals of each of the capacitor elements C1 to Cn.

As described above, when the constant current $I_0$ is supplied to the series charging circuit so as to start charging the capacitors, the voltage Vr between the terminals of the capacitor element Cr whose capacitance is the lowest reaches the withstanding voltage Vh in the shortest period of time. When the voltage Vr between the terminals reaches the withstanding voltage Vh, all the capacitor elements C1 to Cn, and Cr are connected in parallel, whereby the equalization of the voltage Vf between the terminals of each of the capacitor elements C1 to Cn is performed.

The potential of the voltage Vr, which has reached the withstanding voltage Vh, between the terminals of the capacitor element Cr is reduced due to the outflow of the electric charge. In contrast, the potential of the voltage Vf between the terminals of each of the capacitor elements C1 to Cn is increased due to the inflow of the electric charge. As is obvious in the aforementioned formula (5), the current i generated in the parallel circuit due to the transfer of the electric charge (see. FIG. 7B) is linearly decreased because the withstanding voltage Vh and the full charge voltage Va are fixed values, and the change of the current i is determined by the discharge constant time t.

Hereafter, when the voltage Vr between the terminals of the capacitor element Cr whose capacitance is the lowest reaches the full charge voltage Va, the series circuit is formed again, and the constant current $I_0$ is supplied to the series circuit and charged. When the voltage Vr between the terminals of the capacitor element Cr reaches the withstanding voltage Vh, all the capacitor elements C1 to Cn, and Cr are connected in parallel, and the operation of switching between series connection and parallel connection is repeated so as to equalize the voltage Vf between the terminals of each of the capacitor elements C1 to Cn. Then, as illustrated in FIG. 8, every time the parallel operation periods T1 to Tn advance through the repetition of the operation of switching between series connection and parallel connection, the voltage Vr between the terminals of the capacitor elements C1 to Cn reaches the full charge voltage Vf.

Thus, until the voltage Vr between the terminals of the capacitor element Cr whose capacitance is the lowest reaches the withstanding voltage Vh, all the capacitor elements C1 to Cn, and Cr are connected in series and charged. When the voltage Vr between the terminals of the capacitor element Cr reaches the withstanding voltage Vh, all the capacitor elements C1 to Cn, and Cr are connected in parallel, and the electric charge of the capacitor element Cr is transferred to the other capacitor elements C1 to Cn. When the voltage Vr between the terminals of the capacitor element Cr is reduced to the full charge voltage Va due to the outflow of the electric charge, all the capacitor elements C1 to Cn, and Cr are connected in series again and charged. When the voltage Vr between the terminals of the capacitor element Cr reaches the withstanding voltage Vh, the operation of switching between series connection and parallel connection is repeated, and thereby connects all the capacitor elements C1 to Cn, and Cr in parallel and realizes rapid charge.

Actually, when the capacitor element Cr whose capacitance is the lowest is set to 80% of the capacitance of the other capacitor elements C1 to Cn, under the condition that the full charge voltage Va is 3.7 V and the withstanding voltage Vh is 3.8 V, the electric charge Q0, which is represented by Cr×Vh=0.8 Q×3.8/3.7=0.82 Q (Q: electric charge at the time of full charge), is rapidly charged at the first series connection. The amount of energy correlates mass times the speed of light squared, so that the amount of electric charge is approximately 67% of the amount of electric charge at the time of the full charge. When the equalization time of the voltage between the terminals through the subsequent parallel connection is equal to the constant time of the capacitors, the voltage to be charged at the series connection is changed from 3.73 V to 3.8 V, that is, the amount of electric charge is increased by 1.9%.

For example, when the capacitor elements C1 to Cn are constituted by nine capacitors, the amount of electric charge which is represented by (1−0.82) Q×9=1.62 Q may be charged. Accordingly, the number of times (the number of times of charging and discharging) P of the operation of switching between series connection and parallel connection is acquired as 85 times or more based on the calculation formula represented by 1.62 Q=0.019 Q×P. When it is assumed that the maximum of the constant time is approximately 0.5 seconds, the full charge is achieved in 43 seconds or less, which enables rapid charge.

In the present embodiment, the voltage monitor section 20 performs on-off control of the switching elements SW11 to SW1*n* and the switching elements SW21 to SW2*n* based on the voltage Vr between the terminals of the capacitor element Cr and thereby repeats the operation of switching between series connection and parallel connection. However, the present invention is not limited thereto, and a configuration may be adopted in which a counting means for counting the number of times (the number of times of charging and discharging) of the operation of switching between series connection and parallel connection is provided in the voltage monitor section 20 and, when the number of times (the number of times of charging and discharging) of the operation of switching between series connection and parallel connection, which is counted by the counting means, exceeds a predetermined number of times set in advance, the voltage monitor section 20 determines that the voltage Vf between the terminals of each of the capacitor elements C1 to Cn has reached the full charge voltage Va, and stops the operation of switching between series connection and parallel connection.

Also, instead of the aforementioned configuration, another configuration may be adopted in which a period of equalization time, during which the voltage Vf between the terminals of each of the capacitor elements C1 to Cn reaches the full charge voltage Va through the repetition of the operation of switching between series connection and parallel connection, is measured in advance; a counting means for counting an elapsed time from the start of the operation of switching between series connection and parallel connection is provided in the voltage monitor section 20; and, at a time point when the elapsed time counted by the counting means provided in the voltage monitor section 20 reaches the aforementioned equalization time, the voltage monitor section 20 determines that the voltage Vf between the terminals of each of the capacitor elements C1 to Cn has reached the full charge voltage Va, and stops the operation of switching between series connection and parallel connection.

Figure 9:
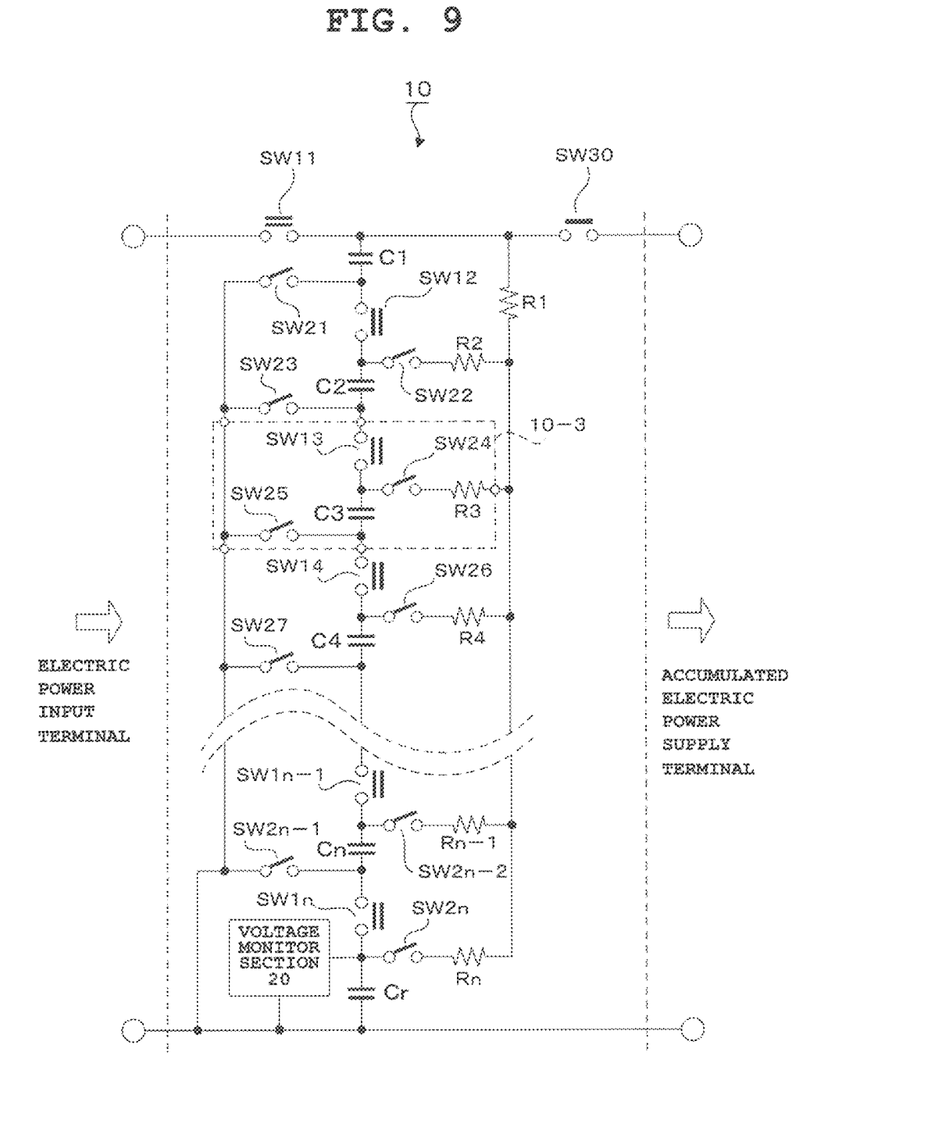
FIG. 9 is a circuit diagram illustrating the whole of the charging apparatus 10, which is aimed at describing a specific structure of the charging apparatus 10.
Figure 10:
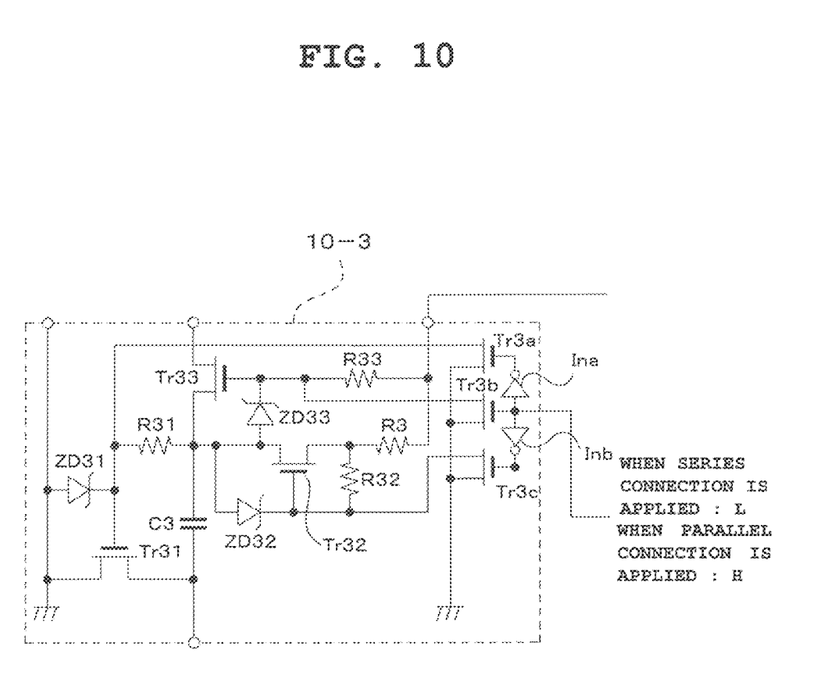
FIG. 10 is a circuit diagram illustrating a structure in which LSI has been applied to the circuit elements 10-3 in FIG. 9.

Next, the specific structure of the charging apparatus 10 will be described referring to FIGS. 9 to 10. FIG. 9 is a circuit diagram illustrating the whole of the charging apparatus 10, which is aimed at describing a specific structure of the charging apparatus 10. FIG. 10 is a circuit diagram illustrating an example of a structure where LSI (Large-scale Integration) has been applied to the circuit elements 10-3 in FIG. 9. The structure of the charging apparatus 10 illustrated in FIG. 9 is basically similar to that of the charging apparatus 10 illustrated in FIG. 1, in which the switching elements SW11 to SW1n, the switching elements SW21 to SW2n, the switching element 30, the capacitor elements C1 to Cn, and Cr, resistors R1 to Rn, and the voltage monitor section 20 are provided.

The switching elements SW11 to SW1n are set to be turned off when not charged, and set to be turned on when charged, so that the capacitor elements C1 to Cn, and Cr are connected to the power source in series. The switching elements SW21 to SW2n are set to be turned on when charged, and set to be turned off when not charged, so that the capacitor elements C1 to Cn, and Cr are connected to the power source in parallel. The switching element 30 is set to be turned on when the electric power is supplied to the load side (accumulated electric power supply side).

The voltage monitor section 20 performs on-off control of the switching elements SW11 to SW1n and the switching elements SW21 to SW2n corresponding to the voltage Vr between the terminals of the capacitor element Cr whose capacitance is the lowest, and connects the capacitor elements C1 to Cn, and Cr in series or parallel with respect to the power source. Specifically, all the capacitor elements C1 to Cn, and Cr are connected in series and charged until the voltage Vr between the terminals to be monitored reaches the withstanding voltage Vh. When the voltage Vr between the terminals reaches the withstanding voltage Vh, all the capacitor elements C1 to Cn, and Cr are connected in parallel, and the electric charge of the capacitor element Cr is transferred to the other capacitor elements C1 to Cn. When the voltage Vr between the terminals of the capacitor element Cr is reduced to the full charge voltage Va due to the outflow of the electric charge, all the capacitor elements C1 to Cn, and Cr are connected in series again and charged. When the voltage Vr between the terminals of the capacitor element Cr reaches the withstanding voltage Vh, the operation of switching between series connection and parallel connection is repeated, and thereby connects all the capacitor elements C1 to Cn, and Cr in parallel and realizes rapid charge. Also, the resistors R1 to Rn are used for overcurrent protection when the capacitor elements C1 to Cn, and Cr are connected in parallel, and each value of the resistors can appropriately be set to the extent that the presence or absence of the resistors is taken into consideration.

The charging apparatus 10 having the aforementioned structure can be provided based on LSI. As one example, FIG. 10 illustrates a structure in which the LSI has been applied to the circuit elements 10-3 in FIG. 9. In addition to the capacitor element C3, a transistor element Tr33 corresponding to the switching element SW13 in FIG. 9, a transistor element Tr32 corresponding to the switching element SW24 in FIG. 9, and a transistor element Tr31 corresponding to the switching element SW25 in FIG. 9, the circuit elements 10-3 illustrated in the diagram include transistor elements Tr3a to Tr3c for performing on-off control of the transistor elements Tr31 to Tr33, voltage divider resistors R3 and R31 to R33 by which a predetermined voltage value is applied to the gates of the transistor elements Tr31 to Tr33, and Zener diodes ZD31 to ZD33. Also, a signal which switches between series connection and parallel connection is applied to the gates of the transistor elements Tr3a to Tr3c. This signal is directly applied to the gate of the transistor element Tr3b, and applied to the gates of the transistor elements Tr3a and Tr3c via respective inverters Ina and Inc.

In the aforementioned structure, when the gates of the transistor elements Tr3a to Tr3c are switched to "L", the transistor element Tr33 is turned on, whereby the capacitor element C3 is connected to the other capacitor elements in series (not illustrated). In contrast, when the gates of the transistor elements Tr3a to Tr3c are switched to "H", the transistor elements Tr31 and Tr33 are turned on, whereby the capacitor element C3 is connected to the other capacitor elements in parallel (not illustrated).

As described above, in the present embodiment, the plurality of the capacitor elements C1 to Cn, and Cr, the switching elements SW11 to SW1n which connect the plurality of the capacitor elements C1 to Cn, and Cr in series, and the switching elements SW21 to SW2n which connect the capacitor elements C1 to Cn, and Cr in parallel are provided. By the switching elements SW11 to SW1n, all the capacitor elements C1 to Cn, and Cr are connected in series and charged until the voltage Vr between the terminals of the capacitor element Cr, whose capacitance is the lowest among the plurality of the capacitor elements C1 to Cn, and Cr, reaches the withstanding voltage Vh. When the voltage Vr between the terminals of the capacitor element Cr reaches the withstanding voltage Vh, all the capacitor elements C1 to Cn, and Cr are connected in parallel by means of the switching elements SW21 to SW2n, and the electric charge of the capacitor element Cr is transferred to the other capacitor elements C1 to Cn. When the voltage Vr between the terminals of the capacitor element Cr is reduced to the full charge voltage Va due to the outflow of the electric charge, all the capacitor elements C1 to Cn, and Cr are connected in series again and charged. When the voltage Vr between the terminals of the capacitor element Cr reaches the withstanding voltage Vh, the operation of switching between series connection and parallel connection is repeated, and thereby connects all the capacitor elements C1 to Cn, and Cr in parallel and realizes rapid charge.

Also, in the aforementioned embodiment, only the voltage Vr between the terminals of the capacitor element Cr, whose capacitance is the lowest among the plurality of the capacitor elements C1 to Cn, and Cr, is monitored, and the operation of switching between series connection and parallel connection is carried out. Therefore, parallel monitors that monitor the voltage between the terminals of each of the capacitor elements connected in parallel, or protection circuits are not necessary. Consequently, the present invention has advantageous effects of restraining heat loss, which contributes to apparatus miniaturization.

Lastly, in recent years, in order to supplement the low power density of a secondary battery, there have been developed apparatuses which combine lithium-ion batteries or air cells with capacitors. The present embodiment can be applied to these apparatuses.

While the present invention has been described with reference to the preferred embodiments it is intended that the invention be not limited by any of the details of the description therein but includes all the embodiments which fall within the scope of the appended claims.

What is claimed is:

1. A charging apparatus comprising:
   a monitor section which monitors a voltage between terminals of a first capacitor element among a plurality of capacitor elements;
   a series charging section which connects the plurality of capacitor elements in series and charges the capacitor elements until the voltage between the terminals of the first capacitor element, which is monitored by the monitor section, reaches a first voltage;
   a parallel discharging section which connects the plurality of capacitor elements in parallel and brings the voltage between the terminals of the first capacitor element close to a voltage between terminals of other capacitor elements, when the voltage between the terminals of the first capacitor element, which is monitored by the monitor section, reaches the first voltage; and
   a series-parallel switching section which repeats an operation of switching between parallel connection and series connection such that the series charging section connects the plurality of capacitor elements in series and charges the capacitor elements when the voltage between the terminals of the first capacitor element, which is monitored by the monitor section, is reduced to a second voltage, and the parallel discharging section connects the plurality of capacitor elements in parallel and brings the voltage between the terminals of the first capacitor element close to the voltage between the terminals of the other capacitor elements when the voltage between the terminals of the first capacitor element reaches the first voltage.

2. The charging apparatus according to claim 1, wherein the first capacitor element has a lowest capacitance among the plurality of capacitor elements.

3. The charging apparatus according to claim 1, wherein the series-parallel switching section further comprises:
   a count section which counts a number of times the operation of switching between parallel connection and series connection is performed; and
   a stop section which determines that the voltage between the terminals of the other capacitor elements except the first capacitor element has reached the second voltage, and stops the operation of switching between parallel connection and series connection, when the number of times counted by the count section with respect to the operation of switching between parallel connection and series connection exceeds a predetermined number of times set in advance.

4. The charging apparatus according to claim 1, wherein the series-parallel switching section further comprises:
   a count section which counts an elapsed time from initiation of the operation of switching between parallel connection and series connection;
   a stop section which determines that the voltage between the terminals of the other capacitor elements except the first capacitor element has reached the second voltage and stops the operation of switching between parallel connection and series connection, when the elapsed time counted by the count section exceeds a predetermined amount of time set in advance.

5. A computer-implemented charging method comprising:
   monitoring a voltage between terminals of a first capacitor element whose capacitance is lowest among a plurality of capacitor elements;
   connecting the plurality of capacitor elements in series and charging the capacitor elements until the monitored voltage between the terminals of the first capacitor element reaches a first voltage;
   connecting the plurality of capacitor elements in parallel and bringing the monitored voltage between the terminals of the first capacitor element close to a voltage between terminals of other capacitor elements, when the monitored voltage between the terminals of the first capacitor element reaches the first voltage; and
   repeating an operation of switching between parallel connection and series connection in such a manner as to connect the plurality of capacitor elements in series and charge the capacitor elements when the monitored voltage between the terminals of the first capacitor element is reduced to a second voltage, and to connect the plurality of capacitor elements in parallel and bring the voltage between the terminals of the first capacitor close to the voltage between the terminals of the other capacitor elements when the monitored voltage between the terminals of the first capacitor element reaches the first voltage.

* * * * *